(12) United States Patent
Kim

(10) Patent No.: US 12,286,035 B2
(45) Date of Patent: Apr. 29, 2025

(54) SEAT TRACK DEVICE OF VEHICLE

(71) Applicants: Hyundai Motor Company, Seoul (KR); Kia Corporation, Seoul (KR)

(72) Inventor: Byung Moon Kim, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 318 days.

(21) Appl. No.: 17/981,837

(22) Filed: Nov. 7, 2022

(65) Prior Publication Data

US 2024/0001812 A1  Jan. 4, 2024

(30) Foreign Application Priority Data

Jul. 4, 2022  (KR) .................. 10-2022-0081884

(51) Int. Cl.
*B60N 2/06* (2006.01)
*B60N 2/02* (2006.01)

(52) U.S. Cl.
CPC ............ *B60N 2/06* (2013.01); *B60N 2/02246* (2023.08); *B60N 2/067* (2013.01)

(58) Field of Classification Search
CPC ...... B60N 2/06; B60N 2/067; B60N 2/02246; B60N 2/02253; B60N 2/02258
USPC ...................................................... 296/65.15
See application file for complete search history.

(56) References Cited

U.S. PATENT DOCUMENTS

| | | | | | |
|---|---|---|---|---|---|
| 5,765,798 A | * | 6/1998 | Isomura | ................. | B60N 2/067 297/344.1 |
| 5,848,775 A | * | 12/1998 | Isomura | ............... | B60N 2/0732 248/429 |
| 5,899,428 A | * | 5/1999 | Gauger | ................ | B60N 2/0715 248/419 |
| 6,055,877 A | * | 5/2000 | Welterlin | ............... | B60N 2/067 297/362.11 |
| 6,105,920 A | * | 8/2000 | Gauger | .................. | B60N 2/067 297/344.1 |
| 2009/0243326 A1 | * | 10/2009 | Kimata | .................. | B60N 2/067 296/65.15 |
| 2012/0145868 A1 | * | 6/2012 | Okada | .................... | B60N 2/067 248/429 |
| 2013/0328363 A1 | * | 12/2013 | Urban | ...................... | B60N 2/42 297/216.1 |
| 2015/0298581 A1 | * | 10/2015 | Nagata | .................. | B60N 2/067 248/429 |

(Continued)

FOREIGN PATENT DOCUMENTS

| | | |
|---|---|---|
| JP | 2022-517564 A | 3/2022 |
| KR | 10-2336768 B1 | 12/2021 |

*Primary Examiner* — Gregory A Blankenship

(74) *Attorney, Agent, or Firm* — Morgan, Lewis & Bockius LLP

(57) ABSTRACT

A seat track device of a vehicle is proposed. The seat track device is configured to enable an electric rail module to be attached to and detached from a manual seat track to easily perform the conversion from the manual seat track to an electric seat track. The seat track device includes a seat track including a lower rail and an upper rail that slides along the lower rail, and a power rail module including a module bracket that is removably coupled to both of the upper rail and a seat, the power rail module being configured to transmit power of a drive part to the module bracket so as to allow the upper rail to slide along the lower rail in an electric manner together with the seat.

11 Claims, 6 Drawing Sheets

(56) References Cited

U.S. PATENT DOCUMENTS

| | | | |
|---|---|---|---|
| 2018/0065507 A1* | 3/2018 | Napau | B60N 2/06 |
| 2019/0070979 A1* | 3/2019 | Nozaki | B60N 2/0248 |
| 2020/0282870 A1* | 9/2020 | Hsi | B60N 2/0727 |
| 2021/0206303 A1 | 7/2021 | Petit et al. | |
| 2022/0396179 A1* | 12/2022 | Zhao | B60N 2/2818 |
| 2023/0294564 A1* | 9/2023 | Zhao | B60N 2/0224 |
| | | | 248/429 |
| 2023/0323919 A1* | 10/2023 | Suzuki | B60N 2/02253 |
| 2024/0001812 A1* | 1/2024 | Kim | B60N 2/02246 |
| 2024/0317116 A1* | 9/2024 | Sprenger | B60N 2/067 |

\* cited by examiner

SEAT TRACK DEVICE OF VEHICLE

CROSS REFERENCE TO RELATED APPLICATION

The present application claims the benefit of priority to Korean Patent Application No. 10-2022-0081884, filed on Jul. 4, 2022 in the Korean Intellectual Property Office, the entire contents of which is incorporated herein for all purposes by this reference.

BACKGROUND OF THE DISCLOSURE

Field of the Disclosure

The present disclosure relates to a seat track device of a vehicle, the seat track being configured such that an electric rail module is attached to and detached from a manual seat track so as to easily perform conversion from the manual seat track to an electric seat track.

Description of the Related Art

A big change in the interior of a vehicle is expected due to the introduction of autonomous vehicles.

For example, in order to realize various seating postures of passengers, the vehicle has a seat arrangement such as a face-to-face mode, a relaxation mode, a long-slide mode, a swivel mode, etc.

Specifically, as various restrictions necessary for driving of a vehicle have been resolved and the interior space of the vehicle has been expanded, various long-slide structures have been proposed that can maximize the interior space in front of and behind a seat.

A method for sliding the seat is classified into a manual method of manually operating the seat and an electric method of operating the seat by a motor.

In case of the electric seat track, as the convenience of sliding operation is increased and specifications of the seat are upgraded, the commercialization of the vehicle is high.

However, compared to the manual seat track, the electric seat track also has problems in terms of manufacturing cost and weight, so the manual seat track is also being developed.

However, as the electric seat track and the manual seat track are separately developed, development cost thereof is excessively increased, and a structure of a new-concept seat track capable of integrating the electric seat track and the manual seat track has been required.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and the present disclosure is intended to propose a seat track device of a vehicle, the seat track device being configured such that an electric rail module is attached to and detached from a manual seat track so as to easily perform the conversion from a manual seat track to an electric seat track.

In order to achieve the above objective, according to one aspect of the present disclosure, there is provided a seat track device of a vehicle, the seat track device including: a first seat track including a first upper rails and a first lower rail, the first upper rail sliding along the first lower rail; and a power rail module including a module bracket that may be removably coupled to both of the first upper rail and a seat, the power rail module being configured to transmit power of a drive part to the module bracket so as to allow the first upper rail to slide along the first lower rail in an electric manner together with the seat.

Rotation power of the drive part may be converted into rectilinear movement of the module bracket and thus the first upper rail coupled to the module bracket may move in a sliding manner.

The seat track device may include: a lead screw disposed in parallel to the seat track, and configured to rotate by the power of the drive part; and a nut member fixed to the module bracket and into which the lead screw may be inserted, and configured to rectilinearly move together with the module bracket in response to rotation of the lead screw.

The seat track device may further include: a second seat track including a second upper rail and a second lower rail, the second upper rail sliding along the second lower rail.

Opposite ends of the module bracket may be coupled to the first and second upper rails, respectively, by bolting; and the seat may be coupled to an upper end of the module bracket.

A shaft of the drive part and the lead screw may be concentrically coupled to each other.

An embedding groove may be formed on a bottom of a vehicle room, and the nut member may be fixed to a lower end of the module bracket, so that the drive part, the lead screw, and the nut member may be provided inside the embedding groove, and an opening of the embedding groove may be covered with a module cover.

The module bracket may be disposed to penetrate through the module cover, and the module cover may be formed in a shape cut along a moving direction of the module bracket.

A shaft of the drive part may be directly connected to the lead screw on a straight line with a tubular connecting member as a medium, and at least two nut members may be partially mounted to the lead screw in a longitudinal direction of the lead screw, and the module bracket may be provided in plural and fixed to the at least two nut members, respectively.

A seat track device of a vehicle may include: a power rail module including a module bracket that may be attached to and detached from a rail sliding along a seat track, and configured to convert a rotation power of a drive part into a rectilinear movement of the module bracket so as to allow the module bracket to rectilinearly move along the rail in an electric manner.

As described above, according to various aspects of the present disclosure, as the electric seat track is provided by coupling the power rail module to the manual seat track, the conversion from the manual sliding specification to the electric sliding specification is easily performed. Therefore, the electric seat track can be implemented without separately developing the electric seat track, so that the development cost of the seat track is reduced.

Furthermore, as the power module rail is embedded into the bottom of the vehicle room, main parts of the power module rail are prevented from being exposed to the outside and the esthetic of the exterior appearance thereof is improved, and physical interference in sliding operation of the seat or discomfort of a passenger are prevented.

DETAILED DESCRIPTION OF THE DISCLOSURE

Figure 1:
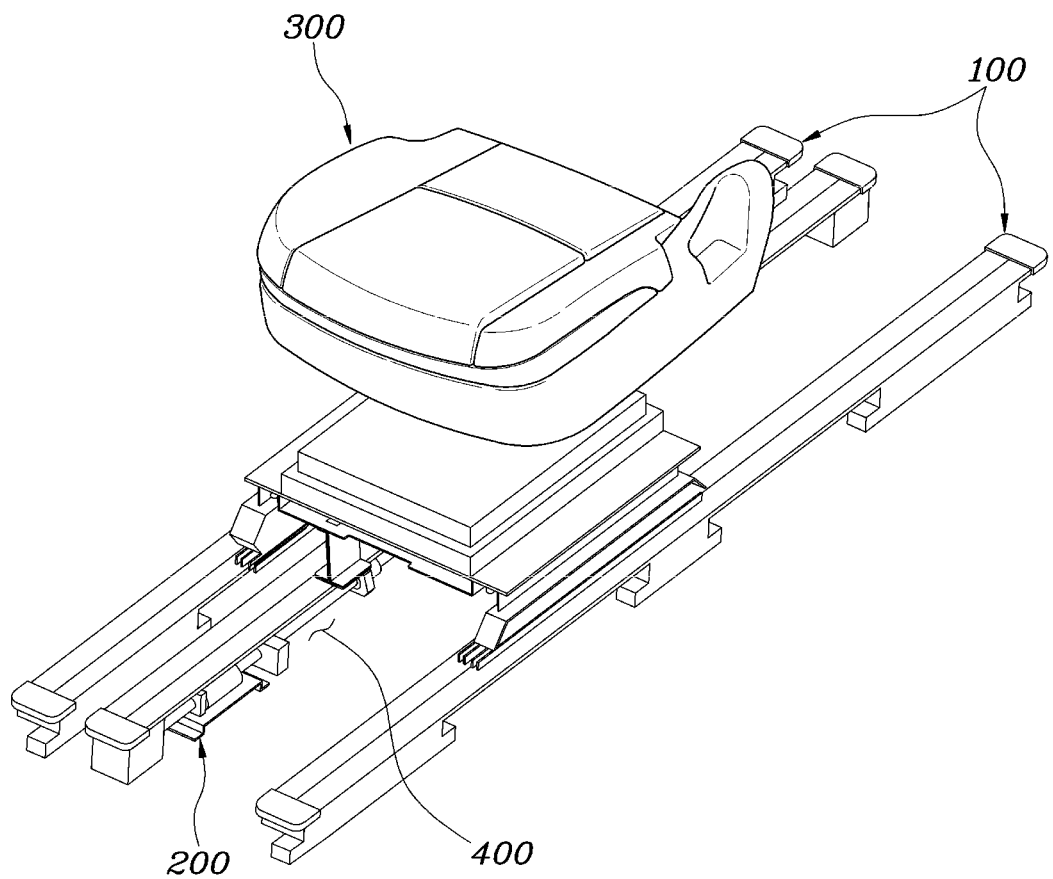
FIG. 1 is a view showing a seat track device according to one exemplary embodiment of the present disclosure, a seat being mounted to the seat track device.

Hereinbelow, a preferred embodiment described in the specification will be described in detail with reference to accompanying drawings, and regardless of the reference numerals, the same reference numerals will refer to the same or like parts, and redundant descriptions thereof will be omitted.

The suffixes "module and "part" for the components used in the following description are given or mixed in consideration of only the ease of writing the specification, and do not have distinct meanings or roles by themselves.

In the following description, if it is decided that the detailed description of known function or configuration related to the disclosure makes the subject matter of the disclosure unclear, the detailed description is omitted.

Furthermore, the accompanying drawings are only for understanding of the preferred embodiments of the present disclosure, and the technical ideas disclosed in the specification are not limited by the accompanying drawings, and those skilled in the art will appreciate that various modifications, additions and substitutions are possible, without departing from the scope and spirit of the disclosure as disclosed in the accompanying claims.

It will be understood that, although the terms first and/or second, etc. may be used herein to describe various elements, these elements should not be limited by these terms. These terms are only used to distinguish one element, from another element.

It is to be understood that when one element is referred to as being "connected to" or "coupled to" another element, it may be connected directly to or coupled directly to another element or be connected to or coupled to another element, having the other element intervening therebetween.

On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Furthermore, a unit or a control unit included in names such as a motor control unit (MCU), a hybrid control unit (HCU), etc. is only a widely used term for a controller that controls a specific function of a vehicle, and does not mean a generic function unit.

The controller may include a communication device communicating with other controllers or a sensor to control the function in charge, a memory storing an operation system or a logic command and input/output information, and at least one process performing determination, calculation, and decision necessary for controlling the function in charge.

Figure 2:
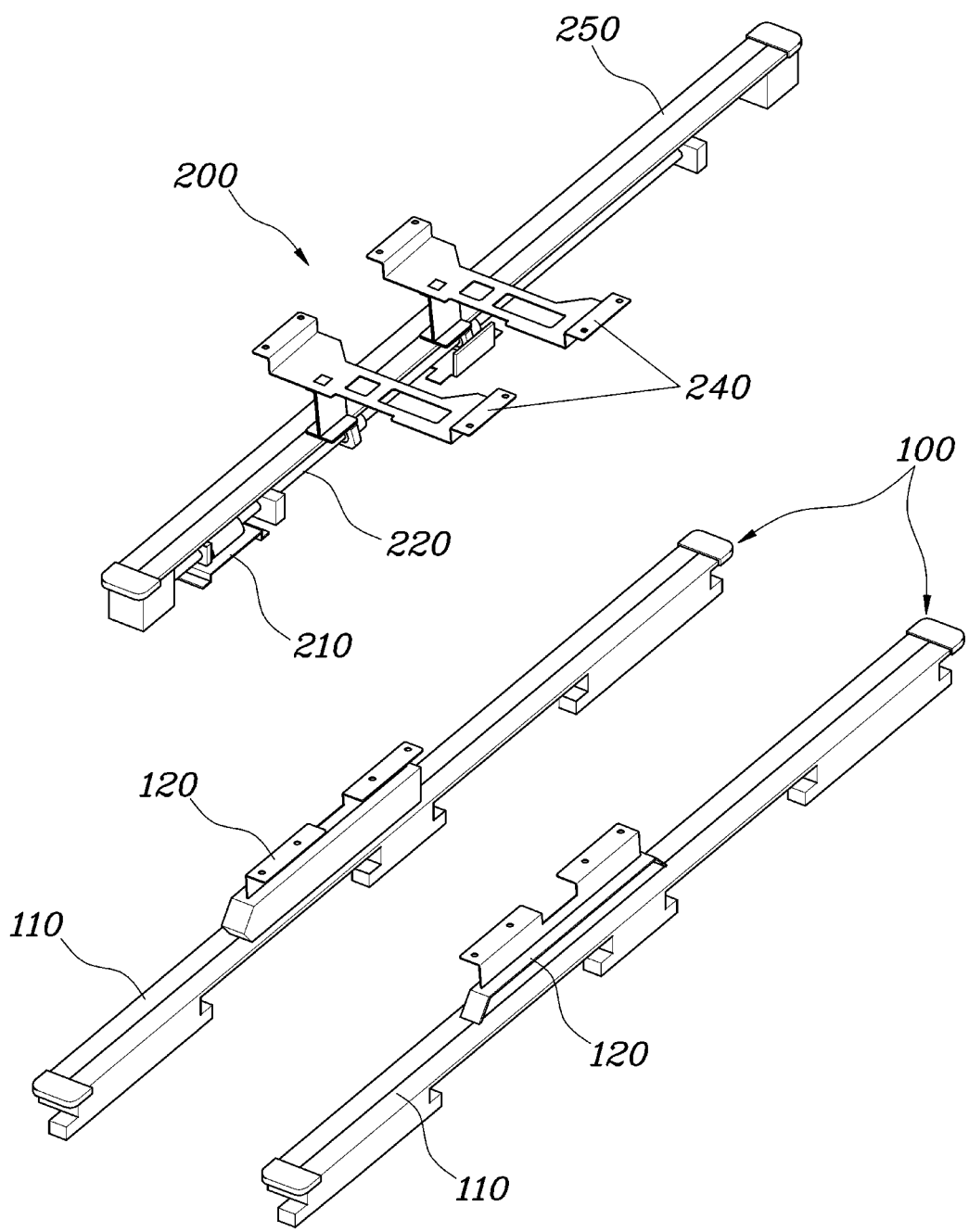
FIG. 2 is an exploded view showing a seat track and a power rail module according to one exemplary embodiment of the present disclosure.

FIG. 1 is a view showing a seat track device according to one exemplary embodiment of the present disclosure, a seat 300 being mounted to the seat track device. FIG. 2 is an exploded view showing a seat track 100 and a power rail module 200 according to one exemplary embodiment of the present disclosure.

Referring to the drawings, the seat track device of the present disclosure includes: the seat track 100 having an upper rail 120 and a lower rail 110 along which the upper rail 120 slides; and the power rail module 200 having a module bracket 240 that is removably coupled to both of the upper rail 120 and the seat 300 and power of a drive part 210 is transmitted to the module bracket 240 so that the upper rail 120 slides along the lower rail 110 in an electric manner together with the seat 300.

For example, the seat track 100 is installed on the bottom inside the vehicle in a longitudinal direction of the vehicle.

The seat track 100 includes the lower rail 110 and the upper rail 120, and the lower rail 110 is fixed to the bottom surface of a vehicle body, and the upper rail 120 is inserted in a rail structure above the lower rail 110, so that the upper rail 120 slides forward and rearward of the vehicle along the lower rail 110.

The seat track 100 is used as a manual seat track when used alone, but when the power rail module 200 is attached to the seat track 100, the seat track 100 is converted into an electric seat track sliding in the electric manner.

The power rail module 200 includes the drive part 210 and the module bracket 240. The module bracket 240 is coupled to opposite upper rails 120 and the seat 300 is coupled to an upper portion of the module bracket 240, so that the seat 300, the module bracket 240, and the upper rail 120 are integrated and move together.

Then, as power of the drive part 210 is supplied to the module bracket 240 and the module bracket 240 rectilinearly moves in a longitudinal direction of the seat track 100, the seat 300 slides along the seat track 100 together with the module bracket 240.

As described above, the present disclosure realizes the electric seat track only with operation of adding the power rail module 200 to the conventional manual seat track 100, the conversion from the manual sliding specification to the electric sliding specification is easy, and the re-conversion to the manual sliding specification is also easily performed.

For reference, a switch for electrically performing sliding of the seat 300 is provided inside the vehicle or at the seat 300, and a controller may be provided to be input a signal while operating the switch to command an operation signal to the motor.

Figure 3:
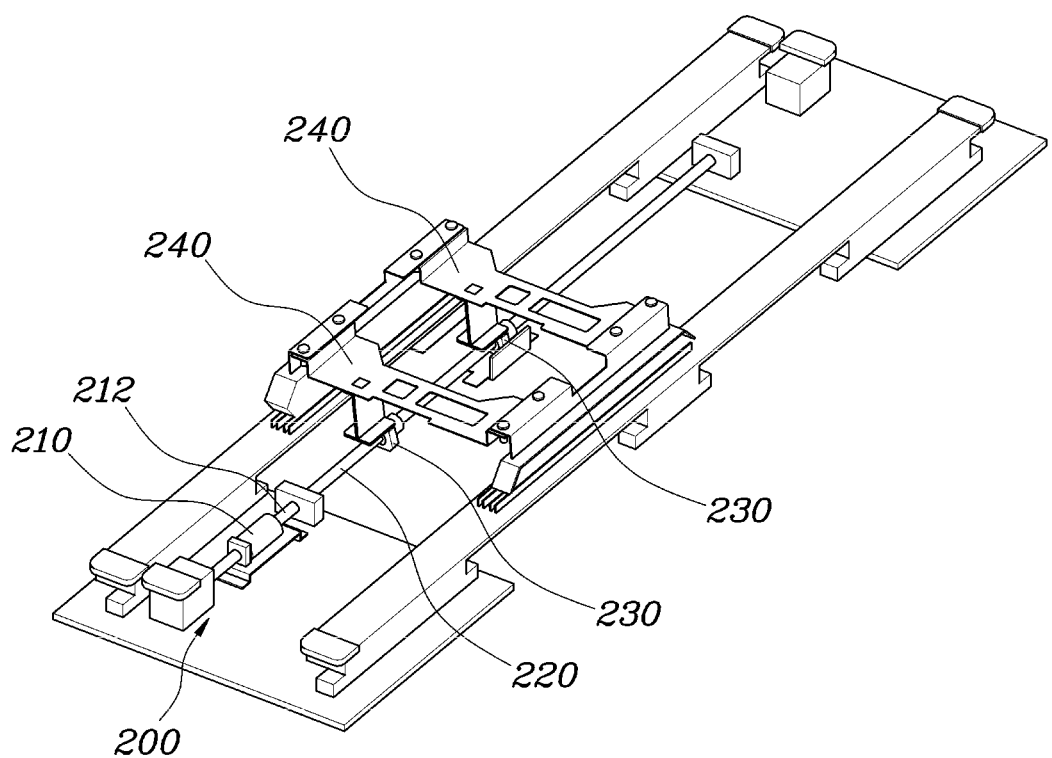
FIG. 3 is a view showing the seat track and the power rail module according to one exemplary embodiment of the present disclosure, the seat track and the power rail being coupled to each other.
Figure 4:
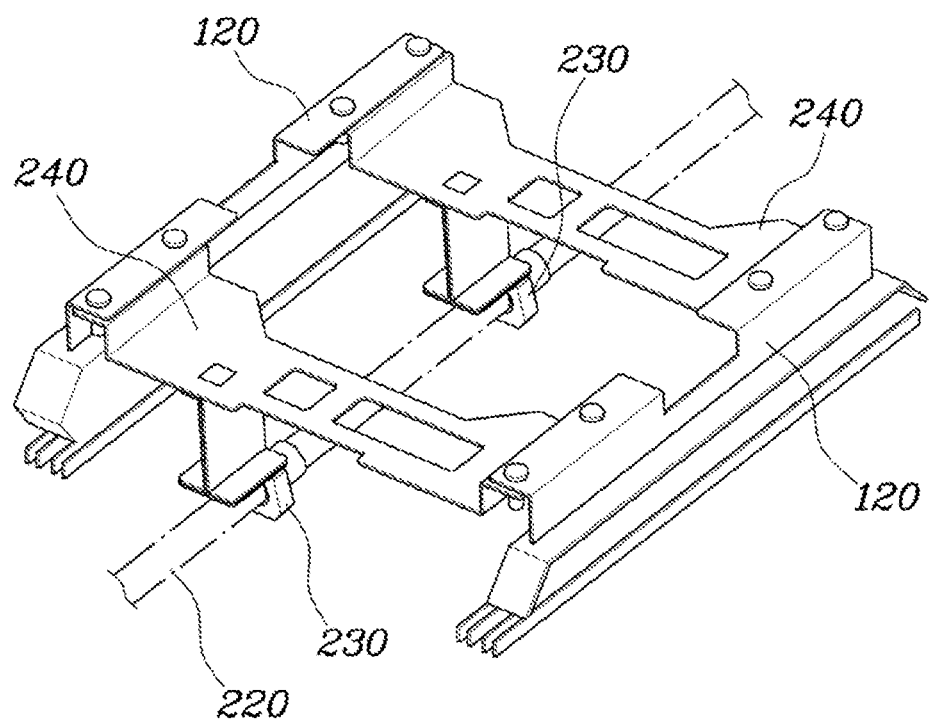
FIG. 4 is an enlarged view showing the power rail module in FIG. 3.

In addition, FIG. 3 is a view showing the seat track 100 and the power rail module 200 according to one exemplary embodiment of the present disclosure, the seat track 100 and the power rail module 200 being coupled to each other. FIG. 4 is an enlarged view showing the power rail module 200 in FIG. 3.

Referring to the drawings, rotation power of the drive part 210 is converted into rectilinear movement of the module bracket 240 so that the upper rail 120 coupled to the module bracket 240 moves in the sliding manner.

For example, the drive part 210 may be an electric motor, and a motor 210 and the module bracket 240 are connected to each other by an element converting the rotation movement to the rectilinear movement, so that the module bracket 240 moves rectilinearly.

Therefore, the module bracket 240 and the seat 300 that are coupled to the upper rail 120 slide along the lower rail 110.

In order to convert the rotation movement of the motor 210 into the rectilinear movement of the module bracket 240, a lead screw 220 and a nut member 230 are used.

Referring to FIGS. 3 and 4, the present disclosure includes the lead screw 220 provided in parallel to the seat track 100, and rotating by power of the drive part 210; and the nut member 230 fixed to the module bracket 240 and into which the lead screw 220 is inserted, and rectilinearly moving together with the module bracket 240 in response to rotation of the lead screw 220.

Figure 6:
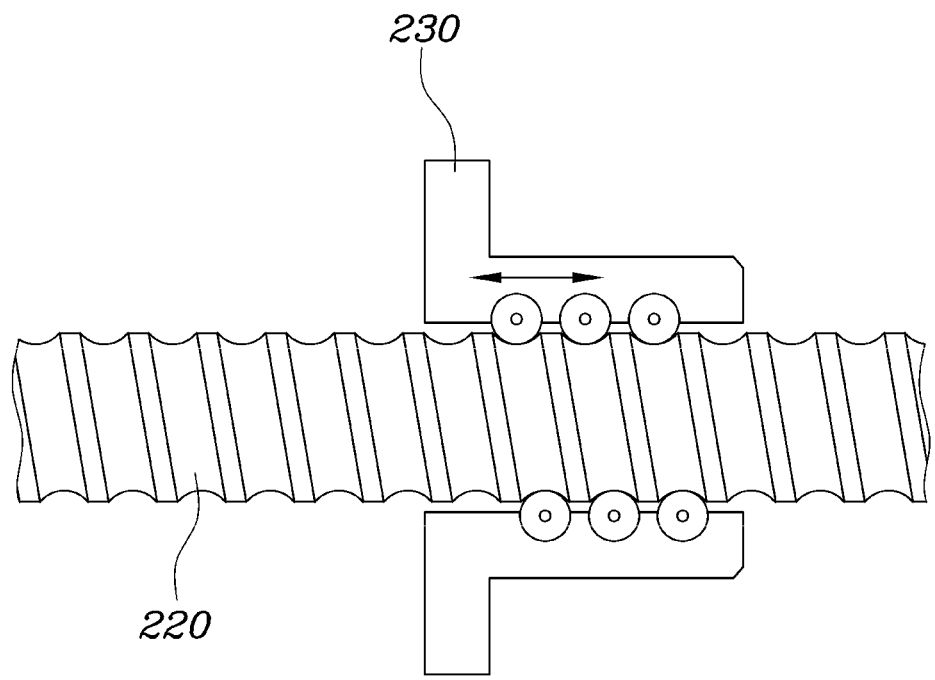
FIG. 6 is a view showing a view showing a coupling structure between a lead screw and a nut member according to one exemplary embodiment of the present disclosure.

In other words, as shown in FIG. 6, when the motor 210 rotates, the lead screw 220 rotates together with the motor 210 and thus the rotation movement is converted into the rectilinear movement by a ball nut formed on an inner surface of the nut member 230, so that the nut member 230 moves rectilinearly along the lead screw 220.

Accordingly, as the module bracket 240 mounted to the nut member 230 moves rectilinearly, the upper rail 120 moves forward and rearward together along the lower rail 110, so that the seat 300 slides forward and rearward.

Meanwhile, as shown in FIG. 4, according to one exemplary embodiment of the present disclosure, opposite ends of the module bracket 240 are respectively coupled to the opposite upper rails 120 by bolting; and the seat 300 may be coupled to an upper end of the module bracket 240.

For example, the module bracket 240 is formed in a plate shape extended transversally and is connected to both the left and right upper rails 120 while being located the left and right upper rails 120.

A plurality of module brackets 240 is provided in the longitudinal direction, and left ends of the module brackets 240 are assembled to two portions of an upper end of the left upper rail 120 by bolting, and right ends of the module brackets 240 are assembled to two portions of an upper end of the right upper rail 120 by bolting.

As described above, as the module brackets 240 are assembled to the upper rails 120 by bolting, the module brackets 240 are easily detached from and attached to the upper rails 120.

Then, a lower end of the seat 300 is directly assembled to upper surfaces of the module brackets 240, or an additional bracket is mounted so that the seat 300 may be assembled.

As described above, according to one exemplary embodiment of the present disclosure, as the module bracket 240 is assembled between the upper rail 120 and the seat 300, the power rail module 200 can be applied to all kind of vehicles if only the design of the module bracket 240 is changed, so that a development cost of the power rail module 200 can be reduced.

Meanwhile, as shown in FIG. 3, according to one exemplary embodiment of the present disclosure, a shaft of the drive part 210 and the lead screw 220 may be concentrically coupled to each other.

In other words, as the shaft of the motor 210 is concentrically connected to the lead screw 220, the lead screw 220 is directly driven in response to the rotation driving of the motor 210. Therefore, manufacturing cost and weight of a product can be reduced by eliminating a part such as a gear box connecting the motor 210 to the lead screw 220.

Figure 5:
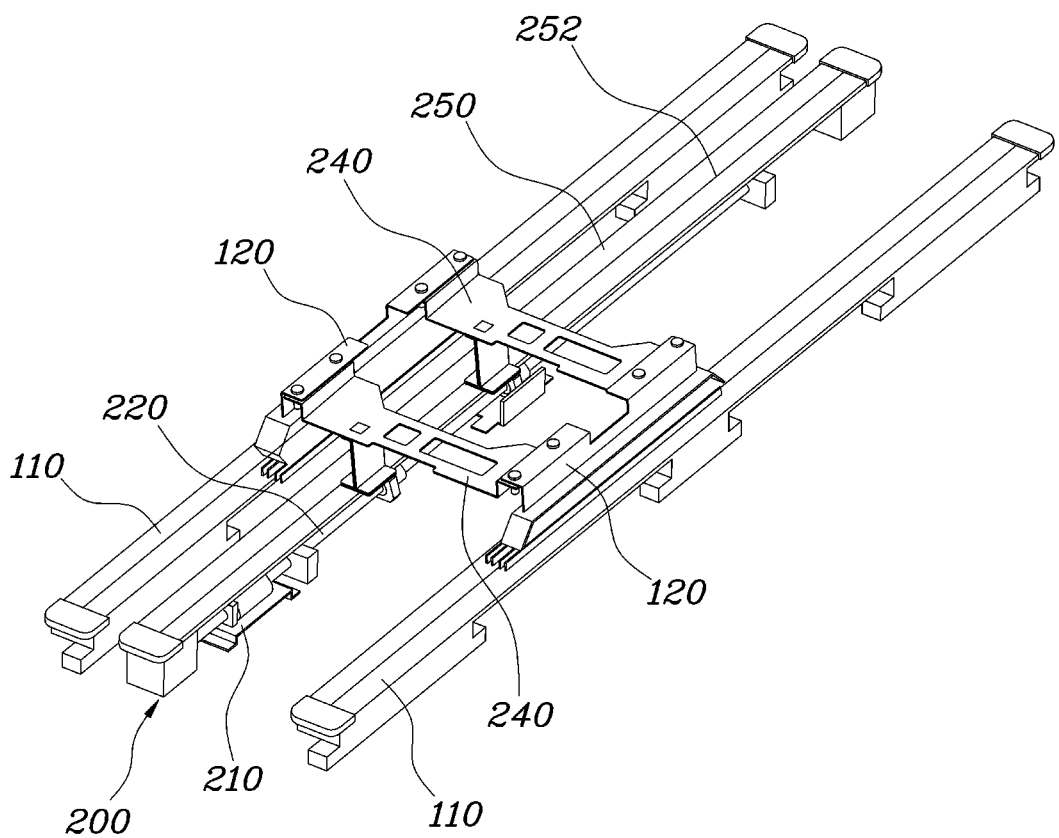
FIG. 5 is a view showing the power rail module according to one exemplary embodiment of the present disclosure, the power rail being covered with a module cover.

In addition, as shown in FIGS. 1 and 5, according to one exemplary embodiment of the present disclosure, an embedding groove 400 is formed on the bottom of the interior space of a vehicle, and the nut member 230 is fixed to a lower end of the module bracket 240 and thus the drive part 210, the lead screw 220, and the nut member 230 are installed inside the embedding groove 400, and an opening of the embedding groove 400 may be covered with a module cover 250.

Specifically, the embedding groove 400 is formed in parallel to the seat track 100 in the longitudinal direction, and the motor 210 is fixed to a front end inside the embedding groove 400.

Then, the lead screw 220 is directly connected to the shaft of the motor 210, and thus the lead screw 220 is longitudinally provided inside the embedding groove 400. Accordingly, the nut member 230 into which the lead screw 220 is inserted is located a rear portion inside the embedding groove 400.

As described above, as the power module rail is embedded into the bottom of the interior space of the vehicle, main parts of the power module rail are prevented from being exposed to the outside so as to improve the esthetic of the exterior appearance thereof. Specifically, physical interference in sliding operation of the seat 300 or discomfort of a passenger are prevented.

Furthermore, as the embedding groove 400 is covered with the module cover 250, the power module rail is prevented from being polluted or damaged by foreign material.

In addition, the module bracket 240 is provided while passing through the module cover 250, and the module cover 250 may be formed in a shape cut along a moving direction of the module bracket 240.

For example, a cut groove 252 is longitudinally formed on a center portion of an upper surface of the module cover 250, and the module bracket 240 is fixed to the nut member 230 through the cut groove 252.

Therefore, when the seat 300 slides, as the module bracket 240 moves along the cut groove 252, the module bracket 240 moves without interfering with the module cover 250.

In addition, as shown in FIG. 3, the shaft of the drive part 210 is directly connected to the lead screw 220 on a straight line with a tubular connecting member 212 as a medium, at least two nut members 230 are partially mounted to the lead screw 220 in a longitudinal direction of the lead screw 220, and the plurality of module brackets 240 may be fixed to the at least two nut members 230, respectively.

In other words, the connecting member 212 is connected to the drive part 210 and the lead screw 220 while being located therebetween, and serves to shaft-connect the drive part 210 to the lead screw 220 and to prevent the shaft of the drive part 210 from being damaged.

Furthermore, as each of the nut members 230 is independently fixed to each module bracket 240, the module bracket 240 smoothly and stably moves along the lead screw 220.

Hereinbelow, a sliding operation of the seat 300 through the seat track device according to one exemplary embodiment of the present disclosure will be described.

When the switch is operated so as to perform rearward sliding of the seat 300, the operation signal of the switch is input into the controller.

Thus, when the controller commands an operation signal to the motor 210, the motor 210 is driven forward.

Then, the lead screw 220 directly connected to the motor 210 rotates forward, so that the nut member 230 inserted in the lead screw 220 moves forward along the lead screw 220.

At this time, the nut member 230 is fixed to the module bracket 240 and the module bracket 240 is coupled to the upper rail 120, so that the upper rail 120 slides along the lower rail 110 and thus the seat 300 slides forward and rearward.

As described above, the present disclosure is configured to couple the power rail module 200 to the manual seat track 100 to provide the electric seat track 100, so that the conversion from the manual sliding specification to the electric sliding specification is easily performed. Therefore, without separately developing the electric seat track, the electric seat track can be implemented and a cost for developing the seat track 100 is reduced.

Furthermore, as the power module rail is embedded into the bottom of the interior space of the vehicle, main parts of the power module rail are prevented from being exposed to the outside so as to improve the esthetic of the exterior appearance thereof, and physical interference in sliding operation of the seat 300 or discomfort of a passenger are prevented.

Although the preferred embodiments of the present disclosure have been disclosed in detail only with respect to the above specific embodiments, those skilled in the art will appreciate that various modifications, additions, and substitutions are possible, without departing from the spirit and scope of the present disclosure, and it is appropriate that the various modifications, additions, and substitutions belong to the accompanying claims.

What is claimed is:

1. A seat track device of a vehicle, the seat track device comprising:
   a first seat track including a first upper rail and a first lower rail, the first upper rail sliding along the first lower rail;
   a power rail module including a module bracket that is removably coupled to both of the first upper rail and a seat, the power rail module being configured to transmit power of a drive part to the module bracket so as to allow the first upper rail to slide along the lower first rail in an electric manner together with the seat;
   a lead screw disposed in parallel to the first seat track, and configured to rotate by the power of the drive part; and
   a nut member fixed to the module bracket and into which the lead screw is inserted, and configured to rectilinearly move together with the module bracket in response to rotation of the lead screw,
   wherein a shaft of the drive part and the lead screw are concentrically coupled to each other.

2. The seat track device of claim 1, wherein rotation power of the drive part is converted into rectilinear movement of the module bracket and thus the first upper rail coupled to the module bracket moves in a sliding manner.

3. The seat track device of claim 1, further comprising
   a second seat track including a second upper rail and a second lower rail, the second upper rail sliding along the second lower rail,
   wherein opposite ends of the module bracket are coupled to the first and second upper rails, respectively, by bolting; and
   the seat is coupled to an upper end of the module bracket.

4. The seat track device of claim 1, wherein an embedding groove is formed on a bottom of a vehicle room, and the nut member is fixed to a lower end of the module bracket, so that the drive part, the lead screw, and the nut member are disposed inside the embedding groove, and an opening of the embedding groove is covered with a module cover.

5. The seat track device of claim 4, wherein the module bracket is disposed to penetrate through the module cover, and the module cover is formed in a shape cut along a moving direction of the module bracket.

6. The seat track device of claim 4, wherein a shaft of the drive part is directly connected to the lead screw on a straight line with a tubular connecting member as a medium, and at least two nut members are partially mounted to the lead screw in a longitudinal direction of the lead screw, and the module bracket is provided in a plural and fixed to the at least two nut members, respectively.

7. A seat track device of a vehicle, the seat track device comprising:
   a first seat track including a first upper rail and a first lower rail, the first upper rail sliding along the first lower rail;
   a power rail module including a module bracket that is removably coupled to both of the first upper rail and a seat, the power rail module being configured to transmit power of a drive part to the module bracket so as to allow the first upper rail to slide along the lower first rail in an electric manner together with the seat;
   a lead screw disposed in parallel to the first seat track, and configured to rotate by the power of the drive part; and
   a nut member fixed to the module bracket and into which the lead screw is inserted, and configured to rectilinearly move together with the module bracket in response to rotation of the lead screw,
   wherein an embedding groove is formed on a bottom of a vehicle room, and the nut member is fixed to a lower end of the module bracket, so that the drive part, the lead screw, and the nut member are disposed inside the embedding groove, and an opening of the embedding groove is covered with a module cover.

8. The seat track device of claim 7, wherein rotation power of the drive part is converted into rectilinear movement of the module bracket and thus the first upper rail coupled to the module bracket moves in a sliding manner.

9. The seat track device of claim 7, further comprising
   a second seat track including a second upper rail and a second lower rail, the second upper rail sliding along the second lower rail,
   wherein opposite ends of the module bracket are coupled to the first and second upper rails, respectively, by bolting; and
   the seat is coupled to an upper end of the module bracket.

10. The seat track device of claim 7, wherein the module bracket is disposed to penetrate through the module cover, and the module cover is formed in a shape cut along a moving direction of the module bracket.

11. The seat track device of claim 7, wherein a shaft of the drive part is directly connected to the lead screw on a straight line with a tubular connecting member as a medium, and at least two nut members are partially mounted to the lead screw in a longitudinal direction of the lead screw, and the module bracket is provided in a plural and fixed to the at least two nut members, respectively.

* * * * *